US009904934B1

(12) United States Patent
Kumar et al.

(10) Patent No.: US 9,904,934 B1
(45) Date of Patent: Feb. 27, 2018

(54) OFFLINE PAYMENT PROCESSING

(75) Inventors: Bharath Kumar, Redmond, WA (US); Kevin J. Steuer, Jr., Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 157 days.

(21) Appl. No.: 13/075,097

(22) Filed: Mar. 29, 2011

(51) Int. Cl.
*G06Q 30/02* (2012.01)

(52) U.S. Cl.
CPC ................................ *G06Q 30/0238* (2013.01)

(58) Field of Classification Search
CPC .. G06Q 20/00; G06Q 30/0238; G06Q 20/108; G06Q 20/20
USPC .......... 705/17, 75, 67, 44, 21; 235/379, 375, 235/380; 455/558, 466
See application file for complete search history.

(56) References Cited

U.S. PATENT DOCUMENTS

| | | | | |
|---|---|---|---|---|
| 6,175,922 B1 * | 1/2001 | Wang | ..................... | G06Q 20/02 380/255 |
| 7,184,747 B2 * | 2/2007 | Bogat | ..................... | G06Q 20/04 455/406 |
| 8,632,001 B1 * | 1/2014 | Ramachandran et al. | .... | 235/379 |
| 2003/0149662 A1 * | 8/2003 | Shore | ............................ | 705/39 |
| 2004/0019564 A1 * | 1/2004 | Goldthwaite et al. | .......... | 705/44 |
| 2004/0127256 A1 * | 7/2004 | Goldthwaite et al. | ......... | 455/558 |
| 2008/0313047 A1 * | 12/2008 | Casares et al. | .................. | 705/17 |
| 2009/0240592 A1 * | 9/2009 | Baumgart et al. | .............. | 705/17 |
| 2009/0254440 A1 * | 10/2009 | Pharris | ............................. | 705/17 |
| 2009/0281904 A1 * | 11/2009 | Pharris | ............................. | 705/17 |
| 2010/0121767 A1 * | 5/2010 | Coulter | ................... | G06Q 20/02 705/67 |
| 2010/0205063 A1 * | 8/2010 | Mersky | .................. | G06Q 20/02 705/17 |
| 2010/0214058 A1 * | 8/2010 | Walker | .................... | G06F 21/00 340/5.6 |
| 2010/0299212 A1 * | 11/2010 | Graylin | .................. | G06Q 20/32 705/14.66 |
| 2010/0306099 A1 * | 12/2010 | Hirson | ................... | G06Q 20/10 705/38 |
| 2011/0225058 A1 * | 9/2011 | Patterson et al. | ............... | 705/17 |
| 2012/0047070 A1 * | 2/2012 | Pharris | ............................. | 705/43 |
| 2012/0072350 A1 * | 3/2012 | Goldthwaite et al. | .......... | 705/44 |

(Continued)

OTHER PUBLICATIONS

"Fact Sheet: Starbucks Card Mobile App & Mobile Payment", retrieved at <http://news.starbucks.com/article_display.cfm?article_id=491>, Jan 24, 2011.

*Primary Examiner* — Vanel Frenel
(74) *Attorney, Agent, or Firm* — Lee & Hayes, PLLC

(57) ABSTRACT

This disclosure is directed to techniques and systems to enable customers to make secure electronic payments to entities (e.g., merchants, vending machines, etc.). The entities may be at brick-and-mortar locations or other locations where the entities are "offline" and may not readily receive payments from customers that have payment accounts stored and managed by a host. In various embodiments, a customer may direct the host to transfer a payment to a merchant after the customer and merchant exchange a code that includes a payment instruction. The code may be used in place of usernames, passwords, or other personal information and may be difficult for others (e.g., bystanders, etc.) to intercept. After the exchange of the code, the customer may authorize the host to a transfer payment to the merchant based on the payment instruction.

24 Claims, 7 Drawing Sheets

(56) References Cited

U.S. PATENT DOCUMENTS

2012/0203672 A1* 8/2012 Morgan ............. G06Q 20/3276
705/27.1
2013/0151358 A1* 6/2013 Ramalingam ............ G07G 1/12
705/16

* cited by examiner

OFFLINE PAYMENT PROCESSING

BACKGROUND

Traditional methods of conducting financial transactions commonly consist of an exchange of currency using paper currency, checks, credit cards, and electronic transfers via a financial institution. In more recent years, an ever increasing amount of financial transactions occur electronically and do not require direct contact with a financial institution. Some transactions may be processed over computer networks, such as the Internet, while other transactions may be processed using telephone-based systems.

It is commonplace for entities to conduct an electronic payment to complete a transaction. In a typical transaction, information about each party is typically exchanged to facilitate the electronic transaction. Some of this information may be personal or private information that a person may not desire to share with a stranger. For example, a customer may have to provide her telephone number during execution of an electronic payment.

Information privacy is a large concern for many people. Often, people take measures to protect their private information to avoid identity fraud, harassment, or the like. These acts may occur when a person obtains private or personal information about another and uses it in a fraudulent or malicious act.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to techniques and systems to enable customers to make secure electronic payments to entities (e.g., merchants, vending machines, etc.). The entities may be at brick-and-mortar locations or other locations where the entities are "offline" and may not readily receive payments from customers that have payment accounts stored and managed by a host. In various embodiments, a customer may direct the host to transfer a payment to a merchant after the customer and merchant exchange a code that includes a payment instruction. The code may be used in place of usernames, passwords, or other personal information and may be difficult for others (e.g., bystanders, etc.) to intercept, such as a scannable code (e.g., a quick response (QR) code), a near-field communication (NFC) code, or other type of close range transmittable code. After the exchange of the code, the customer may authorize the host to a transfer payment to the merchant based on the payment instruction.

During the transaction, the merchant may request additional information from the customer that, after authorization from the customer, may be transmitted to the merchant. The additional information may include a loyalty card identifier, a membership identifier, contact information, delivery information, electronic coupons, or other types of information.

In some embodiments, the host may store transaction information along with information about the payment. For example, the host may request details of the transaction from the merchant, such as the items purchased in a transaction and other types of details. The host may associate the details of the transaction with the payment, which may then be made available to the customer as a transaction report.

The techniques and systems described herein may be implemented in a number of ways. Example implementations are provided below with reference to the following figures.

Illustrative Environment

Figure 1:
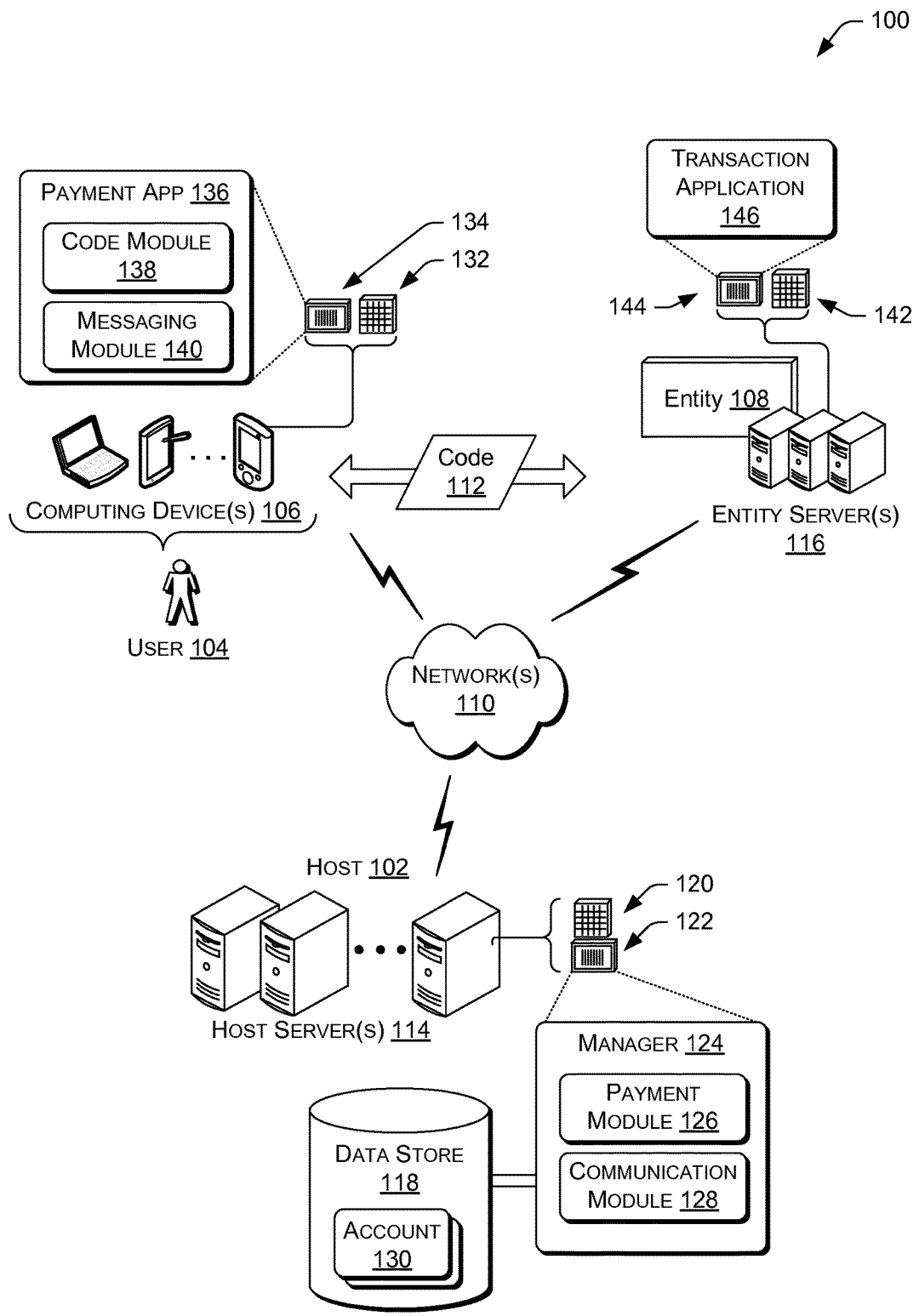
FIG. 1 is a schematic diagram of an illustrative computing environment to provide offline payment processing.

FIG. 1 is a schematic diagram of an illustrative computing environment 100 to provide offline payment processing. The environment 100 may include a host 102 that securely stores payment information for a user 104 that has an associated computing device 106. In accordance with various embodiments, the host 102 may process a payment from the user 104 to an entity 108. The host 102 may be a dedicated repository of user information that includes, but is not limited to, payment information, contact information, and other types of user information. The host 102 may also store an account associated with the entity 108. The entity's account may receive a payment from the user 104 via a transaction facilitated by the host 102.

In various embodiments, the host 102 may be in communication with the computing device 106 and the entity 108 through one or more network(s) 110. The entity 108 may be a merchant or other party that offers goods, services, or other tangible or non-tangible items for sale, lease, or other type of consumption. For example, the entity 108 may be a brick and mortar retail location (e.g., a point of sale in a physical building), an electronic vending machine (e.g., a parking meter in communication with a managing entity, a food vending machine, a newspaper stand, etc.), a restaurant, or other type of entity. The computing device 106 may include a mobile telephone (e.g., a smart phone, etc.), a personal computer, a tablet computer, an electronic book reader (e-book reader), a personal digital assistant (PDA), or another electronic device. As shown in FIG. 1, the entity 108 includes connectivity to the host 102 via the network 110. However, the entity 108 and the computing device 106 may not have direct connectivity via the network to facilitate a payment when the user 104 transacts for goods or services while "in person" at a location of the entity.

In some embodiments, the user 104 may desire to make a payment to the entity 108, via the computing device 106, by leveraging an account stored and managed by the host 102. To initiate a payment request, the computing device 106 and the entity 108 may exchange information using a code 112. In various embodiments, the code 112 may be a scannable code that can be read by an optical scanner, a camera, or other type of reader device. For example, the scannable code may be a bar code, a QR code, or another type of scannable code. The code 112 may also be an NFC code or another type of code that limits acquisition (reading) of the code to a device within a close-proximity to a source of the code and enables a relatively secure transmission. In some embodiments, the code 112 may be inputted manually by the user 104 or another person (e.g., cashier, etc.). When the code 112 is a manually entered code, the code may be translated by the host 102 to produce the payment instruction and thus prevent the recipient of the code from obtaining private information about the provider of the code. For example, the code may be a one-time-use code for the transaction that is initially generated by the host 102. The code 112 may be used to transfer payment instructions, an account identifier, a transaction identifier, and/or other data to initiate the payment between the user 104 and the entity 108. The transfer of the code 112, when the code is a scannable code, may be performed by displaying the code on an electronic display, by printing the code on paper (e.g., on a payment request that is mailed to the user, etc.), or by other display processes (e.g., projection, etc.).

In accordance with various embodiments, the user 104, via the computing device 106, may send a payment request to the host 102, which in turn, may transfer funds and/or other information authorized by the user 104 to the entity 108. For example, the user 104 may desire to transmit a payment, a loyalty card identifier, and other possible information (e.g., a contact number, an address, etc.) to the entity 108 via the host 102. In return, the entity 108 may provide services, items, or other consumable goods (e.g., a parking permit, etc.) to the user 104.

The host 102 may be hosted by host servers 114 that interact with the user 104 via the client devices 106 and the entity 108, via entity servers 116. The host servers 114 may collect, store, and/or disseminate user information, which may be stored in a data store 118. The host servers 114 may include processors(s) 120 and memory 122 to store various applications, modules, or other instructions that, when executed, cause the processor(s) 120 to perform various acts as described herein. In accordance with various embodiments, the memory 122 may store a manager 124, which may include a payment module 126 and a communication module 128.

The payment module 126 may store, maintain, and perform transactions in accordance with received payment instruments to update values in accounts 130. The user 104 and the entity 108 may each have one of the accounts 130 that stores money, credits, or other payment instruments that can be used to track payments, transfer/receive payments, and perform and track other payment information. For example, the user 104 may use her account to transfer a payment to an account of the entity 108 as payment for consumables.

The communication module 128 may facilitate communications between the host 102, the computing device 106, and the entity 108. For example, the communication module 128 may receive a request for payment from the entity 108 that request a specified payment amount from the user 104. The host 102, via the communication module 128, may then transmit the payment request (received from the entity 108) to the computing device 106 that is associated with the user 104. The user 104 may then authorize or reject the payment request, which the host 102 may then communicate back to the entity 108. Besides payment information, the communication module 128 may facilitate requests and transmission of other types of data, such as loyalty card identifiers, membership identifiers, contact information (e.g., email addresses, phone numbers, residence addresses, etc.), or other types of information between the user 104 and the entity 108. The other types of data may be stored by the host servers 114 (e.g., in the data store 118) or stored by the computing device 106 and/or the entity servers 116.

The computing device 106 may include processors(s) 132 and memory 134 to store various applications, modules, or other instructions that, when executed, cause the processor (s) 132 to perform various acts as described herein. In accordance with various embodiments, the memory 134 may store a manager payment application 136, which may include a code module 138 and a messaging module 140. The payment application 136 may be an application that is downloadable from the host 102 and includes specialized software to facilitate access to and use of the accounts 130 stored and managed by the host 102.

In some embodiments, the code module 138 may be configured to generate a code (e.g., the code 112) that includes payment information of the user 104. In various embodiments, the code module may read a code generated by the entity servers 116, where the code includes payment information for the entity 108. Each of these processes is described in further detail in FIGS. 3 and 4, respectively, and presented below. The code 112 may be generated or read locally by the code module 138 with or without assistance from the host 102.

The messaging module 140 may interact with the communication module 128 of the host 102 to enable the user 104 to authorize a payment, to initiate a payment, and/or to make selections related to a request from the entity 108 (via the host 102), such as to authorize dissemination of a loyalty card, contact information, or other information of the user.

Similarly, the entity servers 116 may include processors (s) 142 and memory 144 to store various applications, modules, or other instructions that, when executed, cause the processor(s) 142 to perform various acts as described herein. In accordance with various embodiments, the memory 144 may store a transaction application 146 that may be configured to generate a code (e.g., the code 112) that includes payment information of the entity 108 and/or to read a code generated the computing device 106, which includes payment information for the user 104. The transaction application may also facilitate communications with the communication module 128. In some embodiments, the transaction application 146 may perform some or all of the functions of the payment application 136, and thus enable the entity servers 116 to request a payment and/or other information from the user 104, via the host 102, based on an exchange of the code between the computing device 106 and the entity servers 116.

Illustrative Operation

Figure 2:
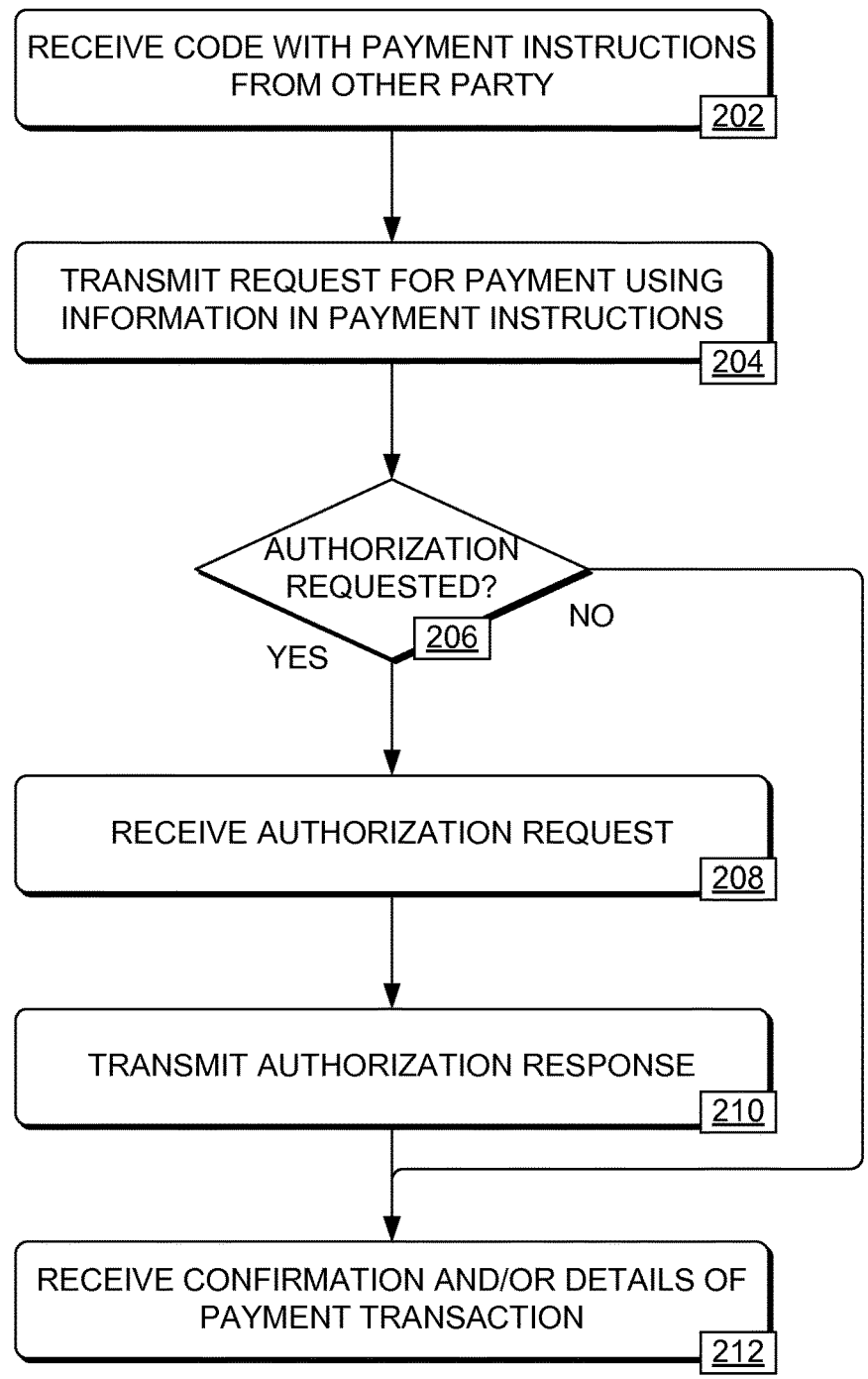
FIG. 2 is a flow diagram of an illustrative process to perform offline payment processing.

FIG. 2 shows a flow diagram of an illustrative process 200 to perform offline payment processing. The process 200 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 200, shall be interpreted accordingly.

The operations are described with reference to the computing device 106 and the entity servers 116 shown in FIG. 1 and may be implemented using the environment 100. The discussion of the process 200 will begin with a discussion where the entity servers 116 generate a code, which is read by the computing device 106 to initiate a transaction. The discussion will then discuss a similar process where the computing device 106 generates the code, which is read by the entity servers 116.

At 202, the computing device 106 may receive the code 112 with payment instructions from the entity 108. For example, the computing device 106 may read a QR code rendered by the entity servers 116 via a display, read a NFC code via a short range transmission between the entity servers 116 and the computing device 106, or otherwise electronically receive payment instructions from the entity servers 116.

At 204, the computing device 106 may transmit a request to the host 102 based on the payment instructions from the code 112. The transmitted request may request that the host 102 make a payment to the entity 108 on behalf of the user 104 from the user's user account that is managed by the host 102.

At 206, the host 102 may determine whether to request authorization from the user 104 for the payment request. The additional authorization may prevent unauthorized payments by the computing device 106, such as via a fraudulent use of a stolen device. However, other protections may be implemented to protect against fraudulent use, such as implementation of pass code protection in the payment application 136.

When the authorization is requested at the operation 206 (following the "yes" route"), the computing device 106 may receive the authorization request at 208. The authorization request may be made via a second communication type (e.g., a telephone call, an email, etc.), and may request personal information such as a personal identification number (PIN) or password. At 210, the computing device may transmit the authorization response to the host 102.

At 212, the computing device (and possibly the entity servers 116) may receive confirmation and/or details of the payment transaction when the authorization information is correct or, following the "no" route from the decision operation 206, in response to the payment request after processing by the host 102. For example, the host 102 may transfer funds, transfer other information (loyalty card identifier, membership identifier, contact information, etc.) between the operations 204 and the confirmation at the operation 212.

As discussed above, the process 200 may also be initiated by the computing device 106 when the computing device generates the code 112, which is received by the entity servers 116 at the operation 112. The entity servers 116 may then transmit a request for payment to the host 102, which in turn may forward the request to the user associated with the payment instruction (contained in the code 112). At the decision 206, the authorization request may enable the user 104 to receive the payment request (following the "yes" route) at the operation 208, decide whether to authorize the payment, and then proceed accordingly. However, the process 200 may not include the authorization at the decision operation 206 (following the "no" route), such as when the entity 108 is pre-approved by the user 104 or for other reasons. At 212, the entity servers 116 (and possibly the computing device 106) may receive a confirmation and/or details of the payment transaction. Each of the above scenarios is described in greater detail in various embodiments in FIGS. 3 and 4.

Figure 3:
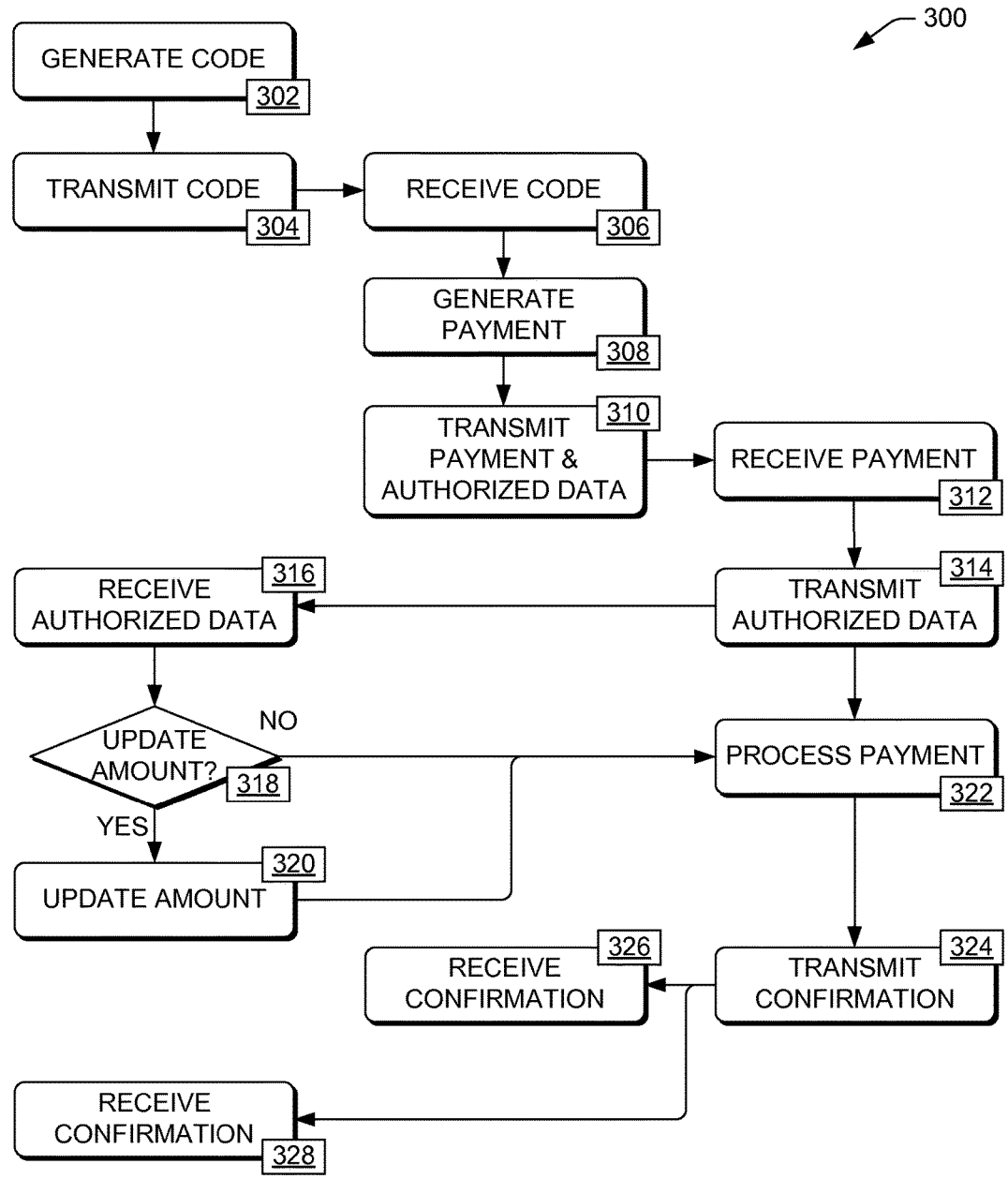
FIG. 3 is a flow diagram of an illustrative process to perform offline payment processing where a user makes a payment based on a code generated by an entity.

FIG. 3 shows a flow diagram of an illustrative process 300 to perform offline payment processing where the user 104 makes a payment based on the code 112 that is generated by the entity servers 116. The collection of blocks is organized under respective entities that may perform the various operations described in the blocks. The order in which the operations are described is not intended to be construed as a limitation, and any number of the described blocks can be combined in any order and/or in parallel to implement the process. The operations are described with reference to the computing device 106, the host servers 114, and the entity servers 116 shown in FIG. 1 and may be implemented using the environment 100.

At 302, the entity servers 116 may use the transaction application 146 to generate the code 112, such as a scannable code that is rendered on a display, a NFC code that is transmitted electronically, or another type of code enabling electronic exchange of data from the entity servers 116 to the computing device 106. The code 122 may include payment instructions (e.g., "pay entity-ABC 50", etc.), a transaction identifier to match a received payment with an amount due by the user 104, and/or other types of requested information. At 304, the entity severs 116 transmit the code 112 to the computing device (e.g., display the code, transmit via NFC, etc.).

At 306, the computing device 106 receives the code 112. In accordance with various embodiments, the computing device 106 may use the code module 138 to receive the code 112 transmitted from the entity servers 116. For example, the computing device 106 may record the code 112 (e.g., take a picture) when the code is a scannable code, or receive the code via a radio frequency when the code is a NFC code. The code module 138 may interpret the code to parse a payment instruction, the transaction identifier, and/or other data included in the code 112.

At 308, the computing device 106 may generate a payment request based on the information the code 112. For example, the messaging module 140 may generate a payment request for the host 102, to request a payment to be made to the entity 108 from funds in an account of the user 104. The payment request may be a text message-based payment, such as a short message service (SMS) text message payment command (e.g., "pay entity $10.00", etc.). The payment request may also be a multimedia messaging service (MMS) command, which may include text, an image or copy of the code 112, or both. Other types of payment requests may also be used to instruct the host 102 to make the payment. At 310, the computing device 106 may transmit the payment request to the host 102 for further processing.

In some embodiments, the code 122 may include a request for additional information. For example, the code may indicate that the user 104 may redeem electronic coupons, use a loyalty card (e.g., an entity-discount identifier or point-program identifier, etc.), submit personal information (e.g., email, address, phone number, etc.) along with the payment or separate from the payment for receipt by the entity 108. Thus, at 310, the computing device 106 may enable the user 104 to transmit additional information that is authorized by the user 104 via the messaging module 140.

At 312, the host servers 114 may receive the payment request and any other data transmitted by the computing device 106 at the operation 310. In some embodiments, the information itself may not be transmitted from the computing device (e.g., an address of the user 104, etc.), but instead may be an authorization for the host 102 to disseminate the information, which may be stored by the host 102 in the accounts 130. For example, the computing device 106 and/or the host servers 114 may pass a token to the entity servers 116 that enable the entity servers to access the authorized information from the host servers 114.

At 314, the host servers 114 may transmit authorized data to the entity servers 116, which may be received at 316 may the entity servers 116. The authorized data may include the transaction identifier, contact information, electronic coupons, loyalty card information, or other information. In some instances the authorized data may require a change to an amount due from the user 104 to the entity 108. At 318, the entity servers 116 may update the amount due based on the receipt of the authorized data (e.g., electronic coupons, loyalty card information, etc.). When the amount due is updated at the decision operation 318 (following the "yes" route), then the entity servers 116 may update the amount at 320 and transmit the updated amount to the host servers to process the payment, otherwise (following the "no" route from the decision operation 318), the host servers 114 may proceed with processing the payment as discussed next.

At 322, the host servers 114 may process the payment requested by the user 104. In some embodiments, such as discussed above, the host servers 114 may perform an authorization process (e.g., the operations 208 and 210 in FIG. 2) prior to processing the payment, such as by communicating with the computing device 106 via a second communication type (e.g. a telephone call, an email, etc.). In various embodiments, the payment application 136 may include security (e.g., password protected, etc.), and thus the authorization process may not be necessary.

The host servers 114 may process the payment at 322 by extracting a specified portion of funds from an account associated with the user 104 and placing the funds in an account associated with the entity 108 of the accounts 130 stored by the host 102 in the data store 118. The host servers 114 may also process the payment by transmitting funds to an entity account that is not stored in the accounts 130, such as by performing an electronic transfer of funds to another entity (e.g., a bank or other financial institution) associated with the entity 108.

At 324, the host servers 114 may transmit a confirmation that the payment has been implemented at the operation 322, which may be received by the computing device at 326 and/or by the entity servers 116 at 328. The confirmation may include the transaction identifier to enable the entity to link the confirmation with the payment request included in the code that was transmitted by the entity servers 116 at the operation 304.

The process 300 is illustrative of several possible implementations of the offline payment processing discussed herein. Other configurations, which may include additional interactions between the entity servers 116, the computing device 106, and the host servers 114 may be included in the process. For example, the computing device 106 may receive an updated amount in response to the update from the operation 320, which may be implemented as a separate operation using the process 300 as described herein.

Figure 4:
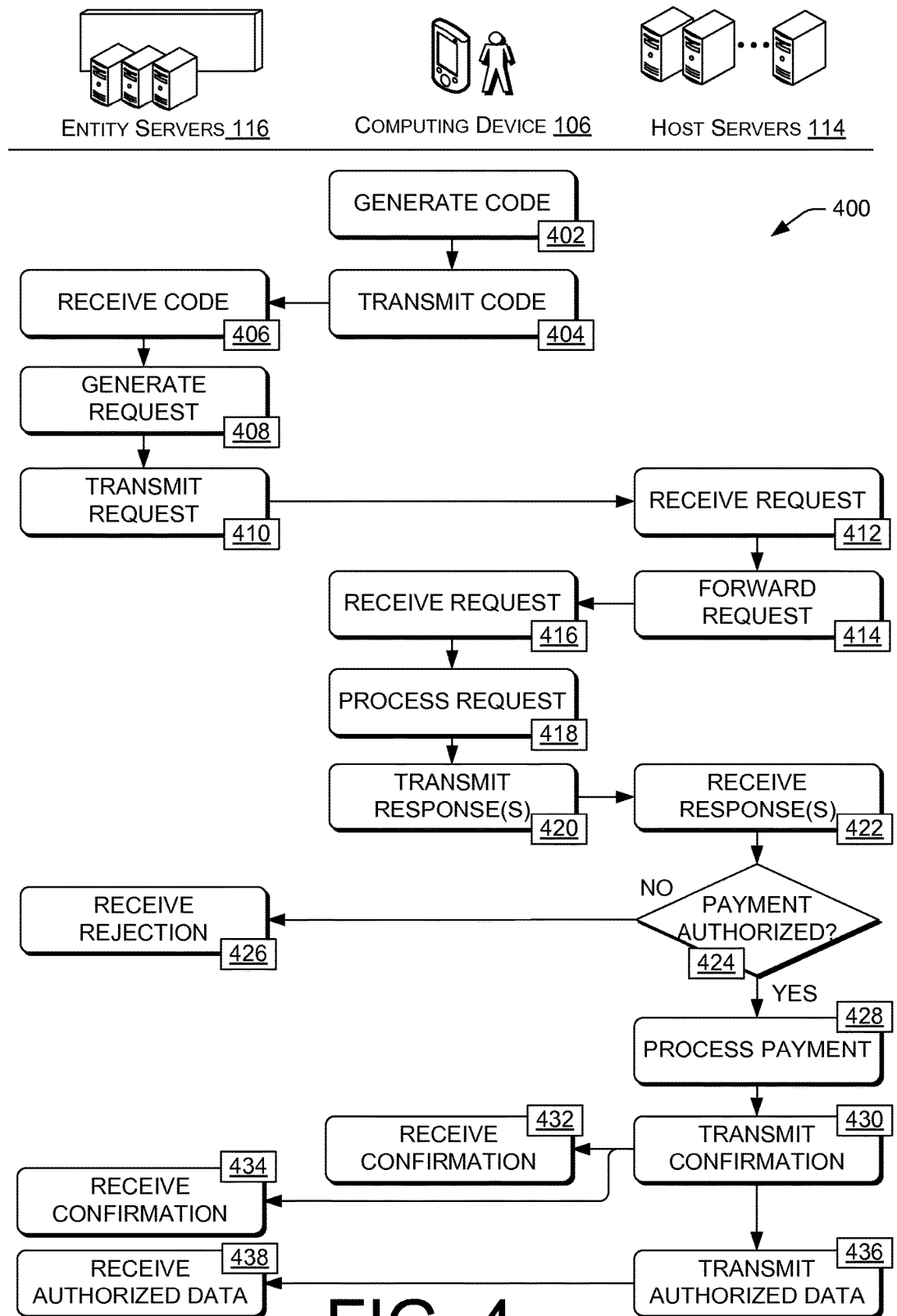
FIG. 4 is a flow diagram of an illustrative process to perform offline payment processing where an entity makes a payment request based on a code that is generated by a user's computing device.

FIG. 4 is a flow diagram of an illustrative process 400 to perform offline payment processing where the entity 108 makes a payment request based on the code 112 that is made available by computing device 106. The collection of blocks is organized under respective entities that may perform the various operations described in the blocks. The order in which the operations are described is not intended to be construed as a limitation, and any number of the described blocks can be combined in any order and/or in parallel to implement the process. The operations are described with reference to the computing device 106, the host servers 114, and the entity servers 116 shown in FIG. 1 and may be implemented using the environment 100.

At 402, the code module 138 of the computing device 106 may generate the code 112, which may be transmitted to the entity servers 116 at 404. The code 112 may include an address or identifier of the user that allows the entity 108 to request a payment from the user 104 via the computing device 106. The code may also include a transaction identifier that may be based in all of the operations in the process 400 to track the payment process and associate the payment with the user 104 and the entity 108. The code module 138 may generate the code using a scannable code, a NFC code, or other type of code that may be transmitted (e.g., renders then transferred optically, transmitted wirelessly, etc.) to the entity servers 116.

At 406, the code module 146 of the entity servers 116 may receive the code 112, such as by scanning the code using a bar code reader, receiving the NFC code, and so forth. At 408, the entity servers 116 may generate a request for the user 104 to transmit a payment to the entity 108. At 410, the entity servers 116 may transmit the request for payment to the host servers 114 for further processing, which may be received by the host servers at 412.

At 414, the host servers 114 may forward the request to the computing device 106, which may be received by the computing device 106 at 416. For example, at the operation 414, the host servers 114 may transmit an authorization request to the user 104 to determine whether the user authorizes a payment in response to the request generated by the entity servers at the operation 408. The user may then response to the request via the messaging module 140, such as by selectively allowing or rejecting various elements of the request. A sample user interface depicting an example request is shown and discussed with reference to FIG. 5. At 418, the messaging module 140 may process the request, which may be transmitted by the computing device 106 at 420 and received by the host servers 114 at 422.

At 424, the host servers 114 may determine whether the payment is authorized based on the response(s) received at 422 from the computing device 106. When the payment is not authorized (following the "no" route), the host servers 114 may transmit a rejection notice to the entity servers 116, which may be received by the entity servers 116 at 426. In some embodiments, the user 104 may reject the payment request but authorize distribution of personal data to the entity 108, which may be relevant when the user desires an update of the amount due based on coupons or other relevant factors. When the payment is authorized based on the response(s) received at 422 from the computing device 106 (following the "yes" route from the decision operation 424), then the payment may be processed by the host servers 114 at 428. As discussed above in relation to the operation 322 in FIG. 3, the host servers 114 may process the payment at 428 by extracting a specified portion of funds from an account associated with the user 104 and placing the funds in an account associated with the entity 108 of the accounts 130 stored by the host 102 in the data store 118. The host servers 114 may also process the payment by transmitting funds to an entity account that is not stored in the accounts 130, such as by performing an electronic transfer of funds to another entity (e.g., a bank or other financial institution) associated with the entity 108.

At 430, the host servers may transmit a confirmation to the computing device 106 and/or the entity servers 116, which may be received by the computing device 106 at 432 and/or by the entity servers 116 at 434, respectively. The confirmation may include the transaction identifier to enable the entity 108 to link the confirmation to the payment request from the operation 408.

At 436, the host servers 114 may transmit the authorized data, which may be included in the response received at the operation 422, to the entity servers 116, which may be received by the entity servers at 438.

In accordance with various embodiments, the computing device 106 may transmit electronic coupons, loyalty card information, or other data to the entity servers that may result in an adjustment of an amount that the user 104 owes the entity 108. In some embodiments, the computing device 106 may transmit the electronic coupons, loyalty card information, or other data with the code at the operation 404 or may transmit this information in another communication at the beginning of the process 400.

Although the processes 300 and 400 discuss instances where the user 104 makes a payment to the entity 108, the processes may also be used to refund a payment of the user 104 from the entity 108, make a payment from the entity 108 to the user 104, or make payments to other parties using the code 112.

Figure 5:
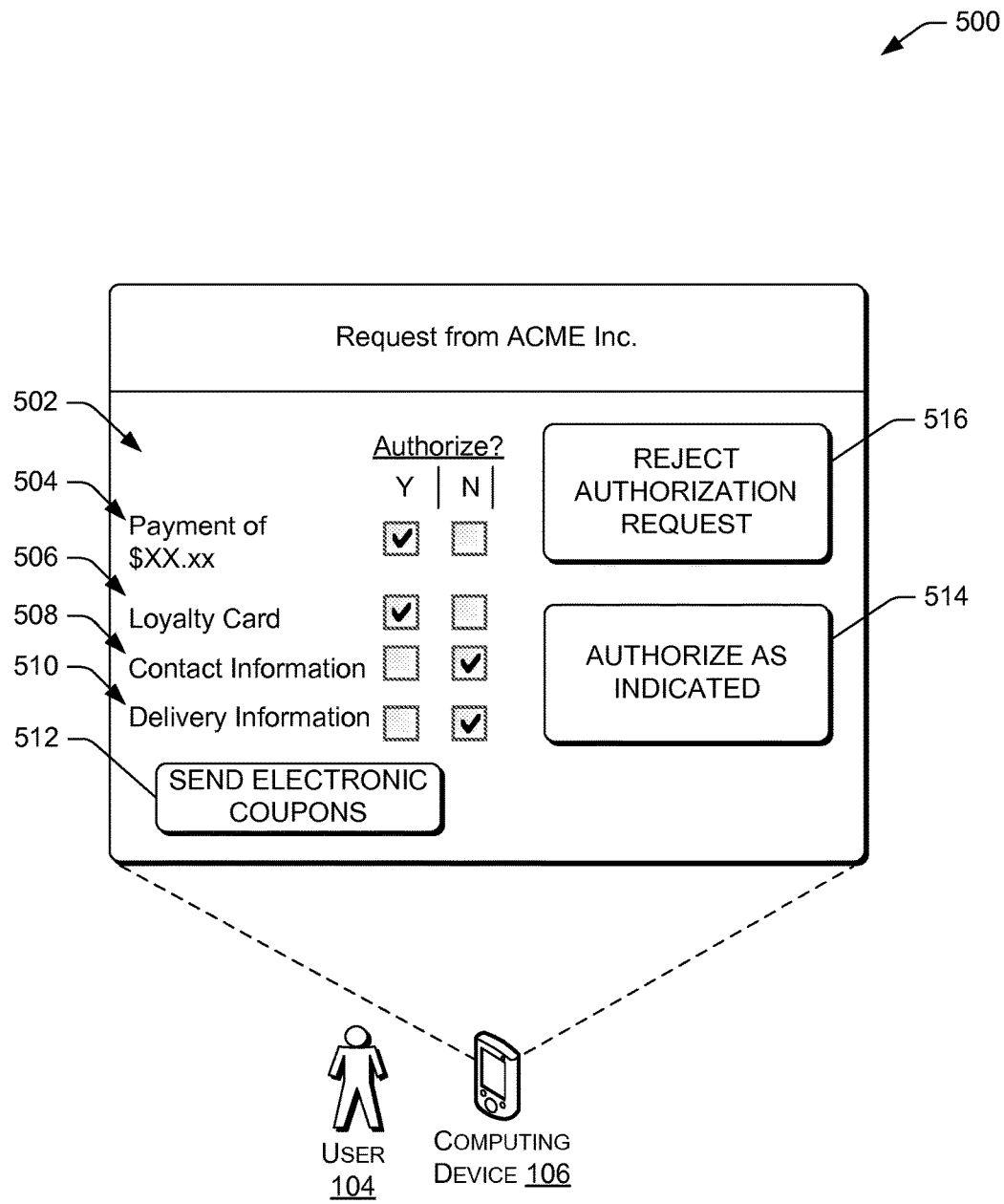
FIG. 5 is an illustrative user interface (UI) rendered by the computing device showing example approval options for a payment request from the entity.

FIG. 5 shows an illustrative user interface (UI) 500 rendered by the computing device 106 showing example approval options for a payment request from the entity 108. The UI 500 may enable the messaging module 140 to display information to the user 104 and to possibly collect information from the user 104 and then transmit a rejection or acceptance of the payment request. For example, the UI 500 may be used to process the request at the operation 418 in FIG. 4.

The UI 500 may include approval options 502, which may enable the user 104 to selectively authorize one or more of the options. In various embodiments, the options 502 may include one or more of a payment amount option 504, a loyalty card option 506, a contact information option 508 and a delivery information option 510. The payment amount option 504 may be derived from information in the code 212, which may be translated by the code module 138 on the computing device 106 to show an amount due to the entity 108. In some embodiments, the payment amount option 504 may allow the user to select a payment instrument to use to make the payment when the payment is authorized. The loyalty card option 506 may include a loyalty card identifier, a virtual punch card, a membership identifier, or other types of entity-specific programs. The contact information option 508 may include a telephone number, an email address, a zip code, a residence address, or other types of contact information. The delivery information option 510 may include a delivery address, a calendar entry (time/day) or other information pertaining to a delivery. For example, when the user is purchasing an item in a brick and mortar store, but selects delivery (e.g., furniture, appliances, etc.); the user 104 may then authorize transmission of the delivery information 510 to be transmitted to the entity 108. In some embodiments, the delivery option may synch or otherwise interact with a calendar application to enable the user to schedule a delivery, installation, or other calendared service.

In some embodiments, each of the options 502 may also show requested data, the data to be sent, or other related data next to the particular option. Thus, the user 104 may be able to quickly identify the information requested by the entity 108 and make appropriate authorizations based on the desires of the user 104.

The UI 500 may also enable the user to submit electronic coupons via an electronic coupon command 512. The electronic coupons may be related to the loyalty card option 506, supplied by the entity 108 and/or the host 102, or otherwise be obtained by the user 104 for use in a transaction with the entity 108.

When the user has completed making selections of the various options 502 to either authorize or not authorize each of the options, then the user 104 may select an "authorize as indicated" command to transmit the authorizations. When the user 104 decides to reject the payment request, the user 104 may select a "reject authorization request" command to reject the payment request from the entity 108.

Figure 6:
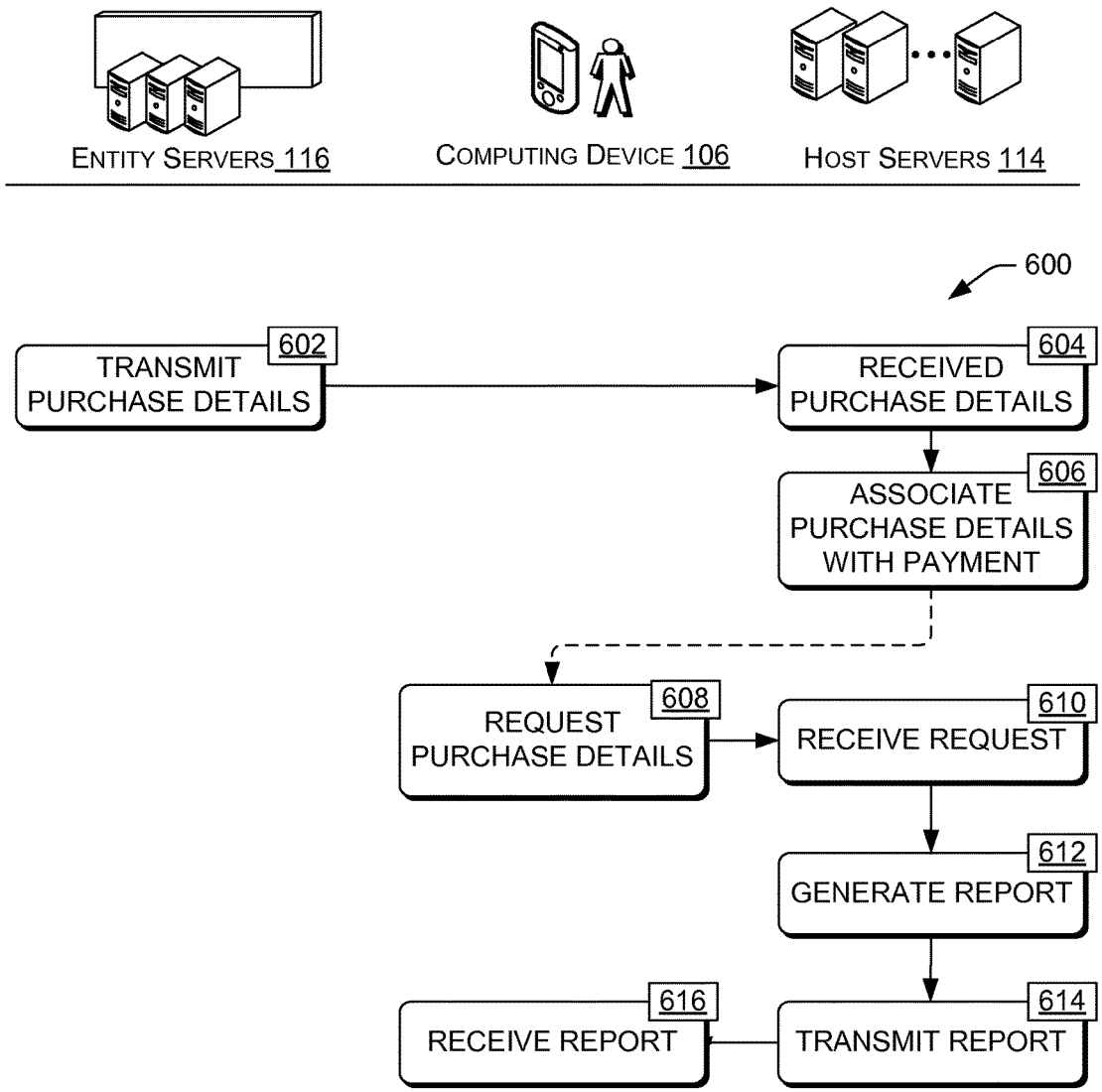
FIG. 6 is a flow diagram of an illustrative process to store and access purchase details for a transaction that occurred between the entity and the user.

FIG. 6 shows a flow diagram of an illustrative process 600 to store and access purchase details for a transaction that occurred between the entity and the user. The collection of blocks is organized under respective entities that may perform the various operations described in the blocks. The order in which the operations are described is not intended to be construed as a limitation, and any number of the described blocks can be combined in any order and/or in parallel to implement the process. The operations are described with reference to the computing device 106, the host servers 114, and the entity servers 116 shown in FIG. 1 and may be implemented using the environment 100.

At 602, the entity servers 116 may transmit purchase details for a transaction to the host servers 114, which may be received by the host servers 114 at 604. At 606, the host servers 114 may associate the purchase details with a payment made by the user 104. For example, the purchase details may include the items and/or services purchased by a user, a description of the entity, or other relevant information to enable the user to learn more information about a purchase. The operations 602-606 may occur after the payment process as described in the operations 300 and 400 above. In some embodiments, the purchase details may be a virtual transaction receipt from the entity 108, which may be stored by the host 102 and/or transmitted to the computing device 106 of the user 104.

At a later time, the user 104 may decide to access the purchase details. At 608, the computing device 104 may request the purchase details from the host 102, which may be received by the host servers 114 at 610. At 612, the host servers 114 may generate a report that includes a transaction history, the purchase request, or other information to fulfill the user's request from the operation 608. At 614, the host servers 114 may transmit the requested information (the report) to the computing device 106, which may be received by the computing device at 616. In some embodiments, the messaging module 140 of the computing device 106 may include a user interface to show the report at 616, which is described next. In various embodiments, the user 104 may request a virtual transaction receipt from the host servers 114 at 608, which may be processed by the host servers 114 at 610-614 and received by the computing device 106 at 616.

Figure 7:
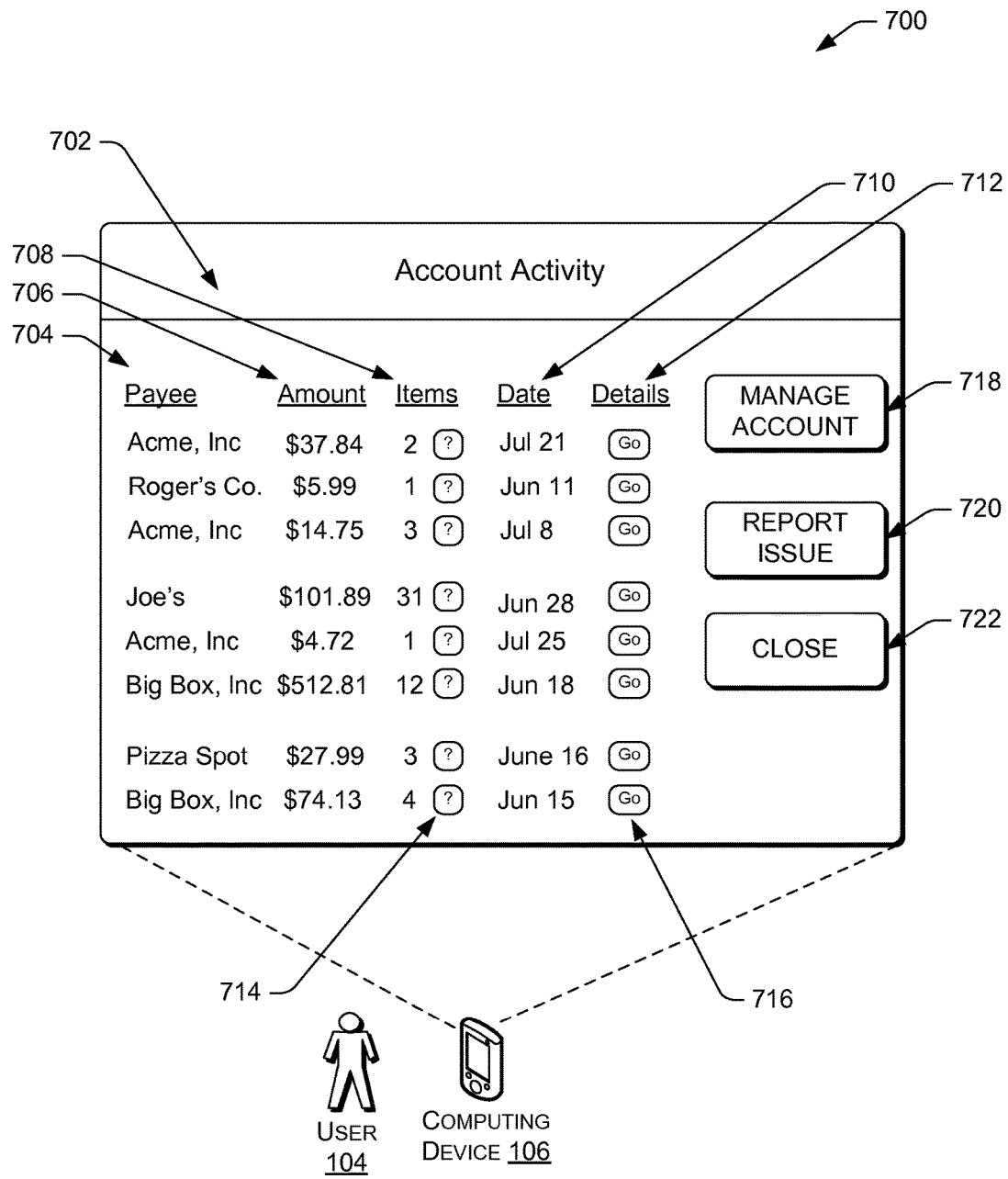
FIG. 7 is an illustrative UI rendered by the computing device showing example payment transaction history.

FIG. 7 is an illustrative UI 700 rendered by the client device 106 showing example payment transaction history. The example payment transaction history may be the report generated by the host servers 114 at the operation 612 in the process 600.

The UI 700 may include reported data 702, which may include a payee 704 (e.g., the entity 108 or other entities), a payment amount 706, items 708, a date 710, and details 712. The items may include a number of items. In some embodiments, the items may also be listed in the reported data 702. As shown in the UI 700, the items 708 may include an item link 714 which may direct the UI 700 to provide a list of the items/services for a selected transaction. Similarly, the details 712 may include a details link 716, which may direct the UI 700 to provide additional details of the transaction, such as a description of the payee, a return policy, a website of the payee, a return form, a computing device used to make or authorize the purchase, or other relevant information. The UI 700 may also include commands to enable the user to manage an account, via a manage-account command 718, report-issues regarding the transaction history, via a report issue command 720, and one or more navigational commands 722.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system for securely providing payment authorization comprising:
   a processor;
   a code scanning component configured to read a code via a first communication channel;
   a presentation device;
   a transceiver; and
   a memory storing a secure payment application that, when executed by the processor, causes the system to:
      read, using the code scanning component, a code generated at least partly by a merchant device associated with a merchant, the code being a quick response (QR) code or a near field communication (NFC) code, wherein the QR code or the NFC code encodes a payment instruction defining a payment amount and an identification of an account associated with the merchant, and wherein the merchant device is an offline merchant device incapable of current communications with a host device;
      transform the code into the payment instruction to enable the payment amount to be received by the account associated with the merchant;
      cause, based at least in part on the payment instruction, a request for payment to be transmitted from the system to the host device via the transceiver;
      in response to a determination at the host device that the payment requires authorization, receive an authorization request, from the host device and via the transceiver, for security credentials of a user associated with the system;
      request that the user enter the security credentials via a user interface of the presentation device;
      receive, via the user interface of the presentation device, the security credentials authorizing the host device to cause the payment amount to be transferred to the account associated with the merchant;
      generate a command to be transmitted over a short message service (SMS) communication channel, the command generated based on the transformed payment instruction and the command authorizing the payment;
      transmit, by the transceiver and via the SMS communication channel that is different than the first communication channel used to read the code, the command from the system to the host device to instruct the host device to cause the payment amount to be transferred from an account associated with the user to the account associated with the merchant; and
      receive confirmation, via the SMS communication channel, that the payment amount has been transferred from the account associated with the user to the account associated with the merchant.

2. The system as recited in claim 1, wherein the secure payment application further causes the system to receive a user selection specifying at least one of a loyalty card identifier, a membership identifier, contact information associated with the user, or delivery information associated with the user, wherein the authorization response transmitted includes the at least one of the loyalty card identifier, the membership identifier, the contact information associated with the user, or the delivery information associated with the user.

3. The system as recited in claim 1, wherein the code comprises the QR code and the reading the QR code comprises capturing an image of the QR code and analyzing the image to identify a machine-readable code and using a decoding algorithm to transform the image of the QR code into the payment instruction.

4. A method comprising:
   generating, by a merchant device, a code to be transmitted to a computing device, the code transformable into a payment instruction that specifies (i) a payment amount for a transaction and (ii) a merchant account or a merchant identifier associated with the merchant account designated for receiving the payment amount;
   transmitting, from the merchant device to the computing device, the code thereby enabling the computing device to transform the code into the payment instruction and to receive security credentials that authorize a host device to cause the payment amount to be sent to the merchant account; and
   receiving, at the merchant device and from the host device, a notification that the payment amount has been caused to be sent to the merchant account at least partly in response to the transmitting of the code to the computing device.

5. The method as recited in claim 4, wherein the code comprises a scannable code or a near field communication (NFC) code that is transformed into the payment instruction.

6. The method as recited in claim 4, wherein the code includes a request for personal information from a user associated with the computing device thereby enabling the computing device to receive the personal information with the security credentials.

7. The method as recited in claim 6, wherein the personal information includes at least one of a loyalty card identifier, a membership identifier, contact information, or a coupon.

8. The method as recited in claim 7, further comprising:
   prior to receiving the notification, receiving, at the merchant device and from the host device, the personal information; and
   updating the payment amount based at least in part on the personal information, and wherein the payment amount sent to the merchant account comprises the updated payment amount.

9. The method as recited in claim 4, further comprising transmitting, from the merchant device to the host device, details of the transaction, the details including at least one of an indication of items or services included in the transaction, a virtual transaction receipt, or information about a return policy of a merchant entity.

10. The method as recited in claim 4, wherein the payment instruction provides a message to enable the computing device to provide an instruction to the host device to make an electronic payment to the merchant account.

11. The method as recited in claim 4, wherein the code comprises a quick response (QR) code.

12. The method as recited in claim 4, wherein the merchant device is an offline merchant device incapable of current communications with the host device.

13. A system for securely providing payment authorization comprising:
   a merchant device comprising:
      a first processor;
      a presentation device; and
      a first memory storing first instructions that, when executed by the first processor, causes the merchant device to:
         generate a code that is transformable into an account identifier of an account associated with the merchant device and a payment amount;
         display the code on the presentation device to enable a code scanning component of a computing device to transform the code into the account identifier of the account associated with the merchant device and the payment amount;
   a host device comprising:
      a second processor; and
      a second memory storing second instructions that, when executed by the second processor, causes the host device to:
         receive, from the computing device, a request to issue a payment to the account associated with the merchant device, the request comprising the account identifier and the payment amount;
         determine that issuance of the payment to the account associated with the merchant device requires user authorization;
         send, to the computing device, a subsequent request for security credentials to authorize the payment to the account associated with the merchant device; and
         receive, from the computing device, a message indicating that a user of the computing device has authorized the payment to the account associated with the merchant device.

14. The system as recited in claim 13, wherein the subsequent request for security credentials to authorize the payment includes a request for personal information of the user.

15. The system as recited in claim 14, wherein the message includes at least one of the personal information or an authorization for the host device to disseminate the personal information to a merchant entity associated with the merchant device.

16. The system as recited in claim 14, wherein the personal information comprises a loyalty card identifier or a membership identifier.

17. The system as recited in claim 13, wherein the code comprises a near field communication (NFC) code.

18. The system as recited in claim 13, wherein the second instructions further cause the host device to process a confirmation that the payment amount has been transferred from an account associated with the user to the account associated with the merchant device.

19. The system as recited in claim 13, wherein the code comprises a quick response (QR) code.

20. One or more non-transitory computer-readable media storing computer-executable instructions that, when executed on one or more processors, cause one or more merchant computing devices to:
   in response to receiving, from a mobile computing device associated with a user, a code including an account identifier, transform the code into a payment request for the user to make a payment to a merchant entity;
   cause the payment request to be transmitted to a host device; and
   process a notice of deposit of the payment received from the host device at least partly in response to:
      the transmitting of the payment request to the host device; and
      the mobile device associated with the user providing security credentials to the host device, the security credentials authorizing the host device to cause the payment to be transferred to an account associated with the merchant entity.

21. The one or more non-transitory computer-readable media as recited in claim 20, wherein the computer-executable instructions further cause the one or more merchant computing devices to generate a text message that includes the payment request.

22. The one or more non-transitory computer-readable media as recited in claim 20, wherein the computer-executable instructions further cause the one or more merchant computing devices to in response to receiving at least one of a loyalty card identifier or a membership identifier from the host device, update information associated with the loyalty card identifier or the membership identifier based at least in part on the payment.

23. The one or more non-transitory computer-readable media as recited in claim 20, wherein the computer-executable instructions further cause the one or more merchant computing devices to cause details of a transaction to be transmitted to the host device, wherein the details of the transaction include items or services included in the transaction.

24. The one or more non-transitory computer-readable media as recited in claim 20, wherein the code comprises at least one of a scannable code or a near field communication (NFC) code.

* * * * *